Figure 1:
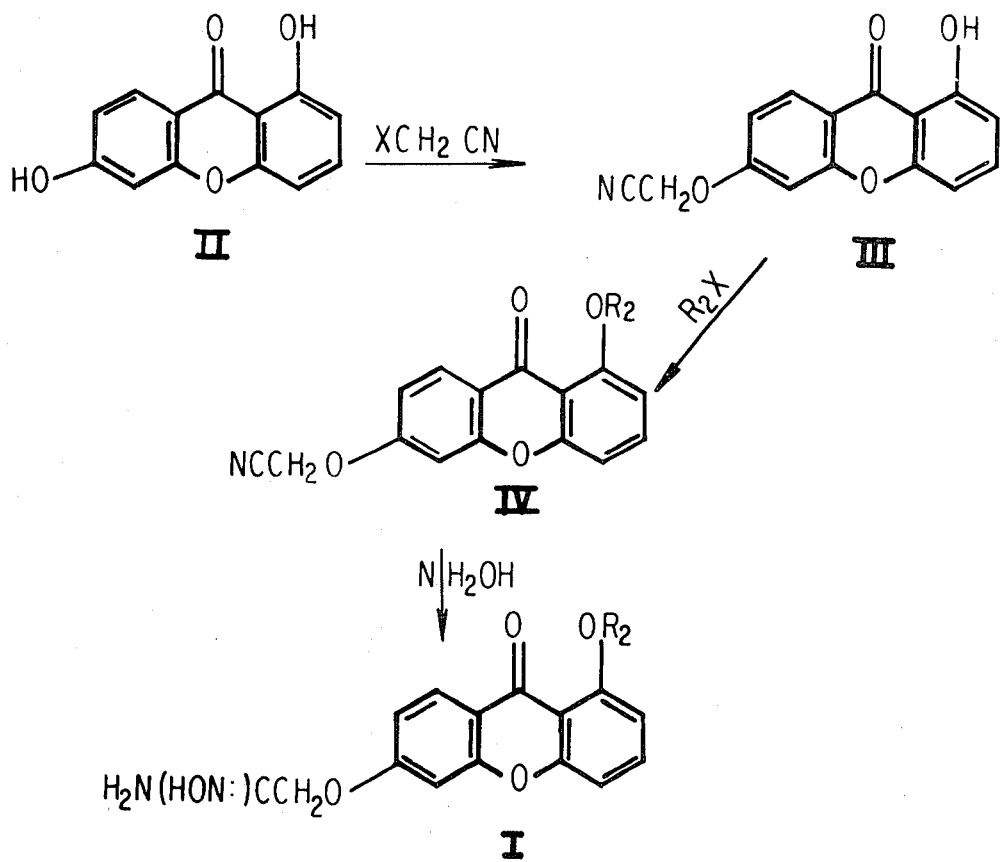

United States Patent [19] [11] 3,923,831
Santilli et al. [45] Dec. 2, 1975

[54] (8-SUBSTITUTED-9-OXOXANTHEN-3-YLOXY) ACETAMIDOXIMES AND NITRILES FOR THEIR PREPARATION

[75] Inventors: Arthur A. Santilli, Havertown; Anthony C. Scotese, King of Prussia, both of Pa.

[73] Assignee: American Home Products Corporation, New York, N.Y.

[22] Filed: May 8, 1974

[21] Appl. No.: 468,051

[52] U.S. Cl. ............................. 260/335; 424/283
[51] Int. Cl.² ................................. C07D 311/84
[58] Field of Search .............................. 260/335

[56] References Cited
OTHER PUBLICATIONS
Chemical Abstracts, Vol. 59, 9994b.

Primary Examiner—Norma S. Milestone
Attorney, Agent, or Firm—Joseph Martin Weigman

[57] ABSTRACT

The disclosure is directed to 6-substituted-1-alkyloxy-xanthen-9-ones which have the formula

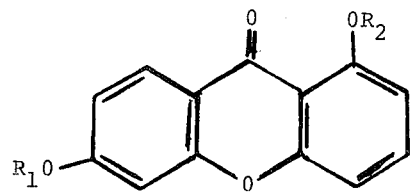

I where $R_1$ is 2-acetamidoxime or acetonitrile and $R_2$ is lower alkyl or hydrogen. The compounds have anti-trichomonal activity or are intermediates in the preparation of trichomonicidal compounds.

2 Claims, 1 Drawing Figure

(8-SUBSTITUTED-9-OXOXANTHEN-3-YLOXY) ACETAMIDOXIMES AND NITRILES FOR THEIR PREPARATION

This invention relates to new and useful 6-substituted-1-alkyloxy-xanthen-9-ones and their pharmaceutically acceptable addition salts and to intermediates in their preparation. The chemical structure of the compounds of the invention may be schematically represented by:

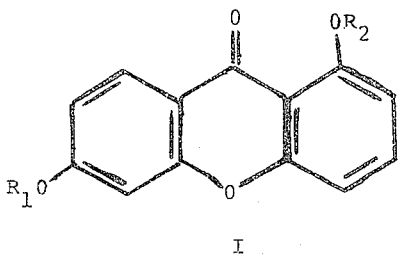

I where $R_1$ is selected from the class consisting of 2-acetamidoxime and acetonitrile and $R_2$ is lower alkyl or hydrogen with the proviso that $R_2$ is lower alkyl when $R_1$ is acetamidoxime.

The term "lower alkyl" as used herein refers to straight chain and branched chain groups having 1 to 3 carbon atoms therein.

A specific embodiment of the invention is 2-(8-methoxy-9-oxoxanthen-3-yloxy)acetamidoxime.

The preparation of these compounds may be represented schematically by the equation shown in FIG. 1, where $R_2$ is as described above and X is halogen.

The closest known prior art is British Pat. No. 923,132 and Chemical Abstracts 59 p 9994 b.

The starting material 1,6-dihydroxy-9-oxoxanthene, formula II of FIG. 1, is described in O. P. Mittal and T. R. Seshrodi, J. Sci. Ind. Research (India) 14B, 76 (1966) and Chemical Abstracts 49, 8932 (1955).

The compound, (8-hydroxy-9-oxoxanthen-3-yloxy)acetonitrile, formula III of FIG. 1, may be prepared by adding a solution of sodium in ethanol to a suspension of 1,6-dihydroxy-9-oxoxanthene in ethanol and filtering the mixture. The filtrate is dissolved in an inert organic solvent, such as N,N-dimethylformamide and a haloacetonitrile, preferably bromoacetonitrile, is added. The reaction mixture is heated at 100° to 150°C for 1 to 3 hours, preferably under reflux for about 1 hour. The mixture is then diluted with water precipitating the product which is recovered and purified, for example by filtration and recrystallization.

The (8-hydroxy-9-oxoxanthen-3-yloxy)acetonitrile thus formed is suspended in ethanol and a solution of sodium in ethanol is added. The mixture is stirred for 5 to 10 minutes, preferably five minutes, and the insoluble material collected and dissolved in an inert solvent, such as N,N-dimethylformamide. A halo-(lower)alkyl, such as iodomethane, is added and the mixture heated at 100° to 150°C for 1 to 3 hours, preferably at reflux for about one hour. The reaction mass is diluted with water and cooled. The resulting precipitate is collected and purified, for example by recrystallization, yielding the product [8-(lower)alkoxy-9-oxoxanthene-3-yloxy]acetonitrile having formula IV of FIG. 1.

The products of the present invention may be prepared by suspending [8-(lower)alkoxy-9-oxoxanthen-3-yloxy]acetonitrile and hydroxylamine hydrochloride in a non-reactive organic medium such as N,N-dimethylformamide and adding a base, such as sodium carbonate, and heating at 70° to 100°C, preferably on a steam bath, for 1 to 3 hours, preferably 1.5 hours. The reaction mixture is diluted with water and cooled, preferably in ice, and affords the product as a precipitate, which may be collected and recrystallized from an organic solvent, such as 2-ethoxyethanol.

The product 2-(8-methoxy-9-oxoxanthen-3-yloxy)acetamidoxime, was assayed for its trichomonacidal activity in vitro by the following procedure. A 12.5 milligram portion of test material, as based on active moiety is added to 2.5 milliliters (ml) of 1 percent phosphate buffer, pH6. Further two-fold dilutions are made in the same buffer. A 1 ml volume of each dilution is transferred to small sterile screw cap assay tubes containing 3.8 ml of Diamond medium (formula furnished by American Type Culture Collection, Rockville, Md.) and 0.1 ml of calf serum. Each assay tube is inoculated with 0.1 ml of a 48-72 hour culture of *Trichomonas vaginalis* ATCC No. 13972. A control assay tube containing no test material is similarly inoculated. The assay tubes are gently shaken and then incubated for 48 hours at 30° centigrade (C.) Following incubation the tubes are gently shaken and, with the aid of a Pasteur pipette, a drop is deposited on a Spiers-Levy eosinophil counting chamber. The chamber is examined by phase contrast microscopy. The number of organisms present in 1 square millimeter is multiplied by 5,000 in order to express the count per ml. The difference in the number of organisms present in the control tube and in the tubes containing the test material represents the relative potency of the test material and is expressed as the percentage kill at the specific dose level. Metronidazole may be used as a suitable positive control test material.

The product 2-(8-methoxy-9-oxoxanthen-3-yloxy)acetamidoxime was found to kill 83 percent of the organisms at a dose of 100 micrograms per milliliter and 89 percent at one milligram per milliliter. This demonstrates that the compound has anti-trichomonal activity in vitro.

When the compounds of this invention are employed as described above, they may be administered alone or in combination with pharmacologically acceptable carriers, the proportion of which is determined by the solubility and chemical nature of the compound, chosen route of administration and standard pharmacological practice. For example, they may be administered orally in the form of tablets or capsules containing such excipients as starch, milk, sugar, certain types of clay and so forth. They may be administered sublingually in the form of troches or lozenges in which the active ingredient is mixed with sugar and corn syrups; and then dehydrated sufficiently to make it suitable for pressing into a solid form. They may be administered orally in the form of solutions which may contain coloring and flavoring agents or they may be injected parenterally, that is intra-muscularly, intravenously or subcutaneously. For parental administration they may be used in the form of a sterile solution containing other solutes, for example, enough saline or glucose to make the solution isotonic.

The dosage of the present therapeutic agents will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. It will generally be found that when the composition is administered orally, larger quantities of the active agent will be required to produce the same effect as a smaller quantity given parenterally. In general, the compounds of this invention are most desirably administered at a concentration level that will generally afford effective results without causing any harmful or deleterious side effects.

In order more clearly to disclose the nature of the present invention, specific examples of the practice of the invention are hereinafter given. It should be understood, however, that this is done solely by way of example and is intended neither to delineate the scope of the invention nor limit the ambit of the appended claims. In the examples, all temperatures are stated in degrees Centigrade, and the following abbreviations are used: "g" for grams, "ml" for milliliters, "min" for minutes and "hr" for hours.

EXAMPLE I

This example describes the preparation of an intermediate (8-hydroxy-9-oxoxanthen-3-yloxy)acetonitrile, a compound of formula III of FIG. 1:

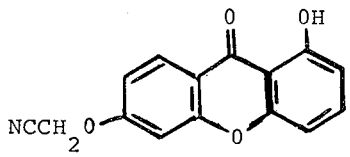

III

To a suspension of 4.56 g of 1,6-dihydroxy-9-oxoxanthene in 35 ml of ethanol was added a solution of 0.46 g of sodium in 40 ml of ethanol. The mixture was filtered and the filtrate evaporated in a rotary evaporator. The residue was dissolved in 50 ml of N,N-dimethylformamide and 2.38 g of bromoacetonitrile was added. After being heated under reflux for 1 hour the mixture was diluted with 200 ml of water. The precipitate thus formed was collected and recrystallized from a mixture of ethanol-N,N-dimethylacetamide to give 2.6 g of product having a melting point of 207°–210°.

Based on the assumed molecular formula $C_{15}H_9NO_4$, it was calculated that the elemental analysis by weight would be 67.42 percent carbon, 3.39 percent hydrogen and 5.24 percent nitrogen. The product was analyzed and found to contain 67.26 percent carbon, 3.25 percent hydrogen and 4.84 percent nitrogen which confirmed the accuracy of the assumed formula. This may be expressed.

Anal. Calcd for $C_{15}H_9NO_4$: C, 67.42; H, 3.39; N, 5.24 Found: C, 67.26; H, 3.25; N, 4.84.

EXAMPLE II

This example illustrates the preparation of an intermediate (8-methoxy-9-oxoxanthen-3-yloxy)-acetonitrile, a compound of formula IV of FIG. 1:

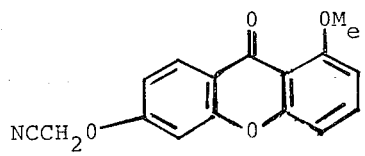

To a suspension of 2.67 g of (8-hydroxy-9-oxoxanthen-3-yloxy)acetonitrile in 30 ml of ethanol was added a solution of 0.23 g of sodium in 20 ml of ethanol. The mixture was stirred for 5 minutes and the insoluble material collected. The material was dissolved in 30 ml of N,N-dimethylformamide and 1.42 g of iodomethane was added and the mixture refluxed for 1 hour. After dilution with 150 ml of water and cooling in ice, a precipitate was formed. This material was collected and recrystallized from ethanol giving the analytical sample having a melting point of 243°–246°.

Anal. Calcd for $C_{16}H_{11}NO_4$: C, 68.32; H, 3.94; N, 4.98 Found: C, 67.79; H, 3.74; N, 4.87.

Following the procedures of Example II but substituting an appropriate haloalkyl for iodomethane similar products may be produced having the 8-position substituted with ethoxy or propoxy.

EXAMPLE III

This example illustrates the preparation of 2-(8-methoxy-9-oxoxanthen-3-yloxy)acetamidoxime, a compound of formula I of FIG. 1:

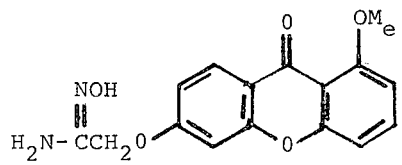

To a suspension of 5.6 g of (8-methoxy-9-oxoxanthen-3-yloxy)acetonitrile and 2.76 g of hydroxylamine hydrochloride in 150 ml of N,N-dimethylformamide was added 8.48 g of sodium carbonate portionwise. The mixture was heated on a steam bath for 1.5 hours and then diluted with 200 ml of water. On cooling in ice a precipitate was formed which was collected and recrystallized from 2-ethoxyethanol to give 2.9 g of product which decomposed at 237°.

Anal. Calcd for $C_{16}H_{14}N_2O_5$: C, 61.14; H, 4.49; N, 8.91. Found: C, 60.74; H, 4.47; N, 8.53.

When tested in the foregoing pharmacological evaluation, the compound killed 83 percent of the organisms present at a dose of 100 micrograms per milliliter and 89 percent of the organisms present at a dose of one milligram per milliliter.

Following the procedure of Example III but substituting an appropriate starting material as described in Example II, similar products may be produced having the 8-position substituted with an ethoxy or propoxy group.

What is claimed is:

1. A compound selected from those having the formula

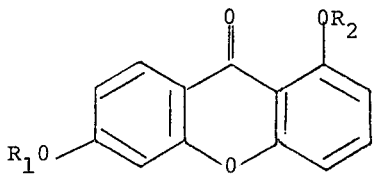

where $R_1$ is acetamidoxime; and $R_2$ is lower alkyl; and the pharmacologically active addition salts thereof.

2. A compound as defined in claim 1 which is 2-(8-methoxy-9-oxoxanthen-3-yloxy)acetamidoxime.

* * * * *